United States Patent
Nigam

(10) Patent No.: US 6,171,444 B1
(45) Date of Patent: Jan. 9, 2001

(54) METHOD AND COMPOSITION FOR THE SIZING OF PAPER WITH A MIXTURE OF A POLYACID AND A POLYBASE

(75) Inventor: Asutosh Nigam, Fremont, CA (US)

(73) Assignee: SRI International, Menlo Park, CA (US)

(*) Notice: Under 35 U.S.C. 154(b), the term of this patent shall be extended for 0 days.

(21) Appl. No.: 09/282,536

(22) Filed: Mar. 31, 1999

Related U.S. Application Data

(60) Provisional application No. 60/082,697, filed on Apr. 22, 1998.

(51) Int. Cl.$^7$ .......................... D21H 17/00; D21H 17/07; D21H 17/09; D21H 17/10
(52) U.S. Cl. ................. 162/158; 162/166; 162/164.6; 162/164.5; 162/168.2; 162/168.1; 162/168.5; 162/162
(58) Field of Search .................. 162/158, 179, 162/162, 164.5–164.6, 166, 167, 168.1–168.7, 183, 173, 175; 427/391, 211, 261; 106/207.1, 208.1, 215.2, 280, 400; 428/195, 211, 152–154

(56) References Cited

U.S. PATENT DOCUMENTS

| | | |
|---|---|---|
| 3,908,071 | 9/1975 | Heim et al. . |
| 4,295,931 | 10/1981 | Dumas . |
| 4,333,795 | 6/1982 | Street . |
| 4,371,582 | 2/1983 | Sugiyama et al. . |
| 4,380,603 * | 4/1983 | Bankert ............................... 524/598 |
| 4,407,994 * | 10/1983 | Bankert et al. ....................... 428/342 |
| 4,478,682 | 10/1984 | Bankert et al. . |
| 4,645,511 | 2/1987 | Heller et al. . |
| 4,733,247 | 3/1988 | Arai et al. . |
| 4,764,585 | 8/1988 | Heller et al. . |
| 4,872,951 | 10/1989 | Maliczyszyn et al. . |
| 4,877,680 | 10/1989 | Sakaki et al. . |
| 4,913,705 | 4/1990 | Schlick et al. . |
| 5,223,338 | 6/1993 | Malhotra . |
| 5,277,965 | 1/1994 | Malhotra . |
| 5,279,885 | 1/1994 | Ohmori et al. . |
| 5,478,631 | 12/1995 | Kawano et al. . |
| 5,502,091 | 3/1996 | Dasgupta . |
| 5,589,277 | 12/1996 | Malhotra . |
| 5,647,898 | 7/1997 | Fuertes et al. . |
| 5,698,478 | 12/1997 | Yamamoto et al. . |
| 5,709,976 | 1/1998 | Malhotra . |
| 5,750,253 * | 5/1998 | Satake et al. ........................ 428/342 |
| 5,798,173 | 8/1998 | Momma et al. . |

FOREIGN PATENT DOCUMENTS

| | | |
|---|---|---|
| 195 05 295 | 9/1995 | (DE) . |
| 195 48 927 | 7/1996 | (DE) . |
| 0775596 | 5/1997 | (EP) . |
| 8-232193 * | 10/1996 | (JP) . |

* cited by examiner

Primary Examiner—Stanley S. Silverman
Assistant Examiner—Jose A. Fortuna
(74) Attorney, Agent, or Firm—Dianne E. Reed; Reed & Associates

(57) ABSTRACT

Compositions and methods are provided for the sizing of paper, to enhance the quality of images printed thereon. The novel sizing compositions contain as a sizing agent a mixture of a polyacid and a polybase. When applied to a paper substrate, such as in an internal or external sizing process, the sizing compositions result in a sized paper substrate that provides high quality printed images when printed with an ink containing a reactive dye having ionizable and/or nucleophilic groups capable of reacting with the sizing agent. Images printed on a paper substrate coated with the sizing compositions of the invention are bleed-resistant, water-resistant (e.g., water-fast), and/or are characterized by an enhanced chroma and hue.

45 Claims, No Drawings

METHOD AND COMPOSITION FOR THE SIZING OF PAPER WITH A MIXTURE OF A POLYACID AND A POLYBASE

CROSS-REFERENCE TO RELATED APPLICATIONS

This application is a continuation-in-part of U.S. provisional patent application 60/082,697, filed Apr. 22, 1998, incorporated herein by reference.

TECHNICAL FIELD

The present invention relates generally to the production of sized paper, and more particularly relates to a novel sizing process and novel compositions useful in conjunction therewith.

BACKGROUND

As printing technology advances, paper manufacturers are faced with the increasingly rigorous demands of their customers for high quality paper that is economically attractive. For example, there is a keen demand for papers that meet high quality standards with respect to brightness, opacity, and dry and/or wet strength, and that, upon printing with any of a wide range of colorants, provide a water-resistant printed image. The customer further demands that such papers be amenable to use with a variety of printing techniques, including not only conventional printing techniques, but also "impact free" printing techniques, e.g., inkjet printing (particularly colored inkjet printing), laser printing, photocopying, etc.

In response, paper manufacturers have attempted to meet their customers' demands for such high quality paper through a process termed "sizing." "Sizing," which encompasses both "internal sizing" and "external sizing," affects the manner in which colorants and particularly ink interact with the fibers of the paper. "Internal sizing" involves introduction of sizing compositions within the entire fibrous mass at the pulp stage of paper manufacturing (i e., to the wet pulp, or more specifically, to the prepared papermaking furnish) before the stock is formed into a sheet, resulting in the distribution of the sizing composition within the entire fibrous mass that is subsequently used to produce the flat fibrous paper sheet. "External sizing" (also termed surface application, pasting, saturating or coating) involves application of a sizing composition to at least one surface of a flat fibrous paper sheet, so that the sizing composition is present on or in at least one of the two faces of the flat fibrous sheet. Paper and paper-based products are internally and/or externally sized to increase the resulting paper's strength, resistance to picking and scuffing, and resistance to undue penetration of water, organic solvents, oils, inks, and various types of aqueous solutions. Sizing is also used to improve the paper's smoothness and optical characteristics. In general, sizing is recognized to confer a number of advantages, including but not limited to the foregoing, with perhaps resistance to penetration of water and aqueous inks (e.g., bleed resistance) of utmost importance.

Various materials have been used as external and/or internal sizing agents, such as conventional and modified starches, polyvinyl alcohol, cellulosic derivatives, gelatin, rosin, proteins such as casein, natural gums and synthetic polymers. Internal sizing agents are generally referred to as acid, neutral, or alkaline internal sizes. Acid sizes are typically rosin based and precipitated by alum. Neutral sizes may also be rosin-based, and are used at near-neutral pH, while alkaline sizes are synthetic materials such as alkenyl succinic anhydride (ASA) and alkyl ketene dimer (AKD). Although these materials are effective to various degrees under certain conditions, use of each is associated with certain limitations. For example, it is often necessary to use large amounts of these conventional sizing agents in order to provide paper having the desired properties. However, the opacity and brightness of the paper substrate decreases in direct proportion to the amount of sizing agent applied to the paper. Moreover, as the amount of sizing agent and/or the cost of the sizing agent increases, the cost of producing the paper increases, making high quality papers having the desired characteristics prohibitively expensive and not economically viable. Certain sizing agents impart relatively poor bleed resistance and water resistance of imprinted inks, and thus must be used with insolubilizing agents to ensure production of a paper having satisfactory water resistance.

Conventional and modified starches are the most common sizing agents in use in the industry. Exemplary starch-based sizing agents include hydrophobic starches (see, e.g., U.S. Pat. No. 2,661,349), blends of hydrophobic and non-hydrophobic starches (see, e.g., U.S. Pat. No. 4,239,592; EP 350,668), and blends of treated starches and/or cationic starches (see, e.g., U.S. Pat. No. 4,872,951; EP 620,315; U.S. Pat. No. 5,647,898). However, while starches may provide improved porosity, these compounds generally do not provide for improved bleed resistance or water resistance of inks printed on the treated paper substrates.

Several synthetic sizing agents are presently available, and may be used in internal sizing and/or external sizing processes. Exemplary synthetic sizing agents include hydrophobic cellulose reactive sizing agents (see, e.g., U.S. Pat. Nos. 4,478,682; 3,840,486), cationic polymers (see, e.g., U.S. Pat. No. 3,006,806), and water-soluble, poly (aminoamide) resins (see, e.g., U.S. Pat. No. 4,478,682). Synthetic compounds have also been used to enhance the dry and/or wet strength of paper (see, e.g., U.S. Pat. Nos. 5,138,669; 3,058,873; 5,510,004; 5,659,011), either at the internal sizing or external sizing steps. However, synthetic sizing agents tend to be expensive, due to both the cost of the starting material and the amount that is required to provide a paper substrate having the desired characteristics.

Unfortunately, the use of sizing agents normally results in a decrease in the porosity of the final paper substrate. Thus, while the final sized paper substrate may have the desired brightness and opacity, it may not provide for a printed image that is of a desired optical density or color intensity. In addition, as the porosity of the paper increases, the paper becomes less amenable to various handling processes during manufacturing. For example, envelope manufacturers demand that the paper available to them have a relatively low porosity. If the porosity of the paper is too high, the paper is too stiff for handling by the automatic industrial devices for folding and sorting (e.g, devices of the "suction extractor" type) during envelope production. Moreover, in contrast to lower porosity papers, high porosity papers require slower machine speeds and refining and draining operations that have relatively high energy costs, both of which add up to decreases in plant productivity, efficiency, and cost effectiveness.

There is a need in the field for sizing agents and methods that provide an effective, cost efficient means for sizing paper, are amenable for use with a wide variety of paper manufacture and post-manufacture handling processes, and provide high quality, water-resistant images.

SUMMARY OF THE INVENTION

The present invention features novel sizing methods and sizing compositions, wherein the sizing compositions are composed of a sizing agent comprised of a mixture of a polyacid and a polybase. When applied to a paper substrate, such as in an external sizing process, the sizing compositions provide a coated paper substrate that yields high quality printed images when printed with an ink containing a reactive dye having ionizable and/or nucleophilic groups capable of reacting with the sizing agent. Images printed on a paper substrate coated with the sizing composition of the invention are bleed-resistant, water-resistant (e.g., water-fast), and/or are characterized by an enhanced chroma and hue.

It is a primary object of the invention to address the above-mentioned need in the art by providing a sizing composition that efficiently binds colorant upon printing, and thus provides an economical, efficient means for processing of paper that provides a high quality printed image.

Another object of the invention is to provide a printed, sized paper substrate that is of high quality, bleed-resistant, and provides water-resistant (e.g., water-fast) images that are of a highly desirable optical density and brightness.

Still another object of the invention is to provide a method for sizing paper using the sizing compositions of the invention.

Still an additional object of the invention is to provide a method for printing on a sized paper substrate to provide water-resistant (e.g., water-fast) images thereon.

Additional objects, advantages and novel features of the invention will be set forth in part in the description which follows, and in part will become apparent to those skilled in the art upon examination of the following, or may be learned by practice of the invention.

DETAILED DESCRIPTION OF THE INVENTION

DDEFINITIONS AND NOMENCLATURE:

It must be noted that, as used in the specification and the appended claims, the singular forms "a," "an" and "the" include plural referents unless the context clearly dictates otherwise. Thus, for example, reference to "a polyacid" in a composition means that more than one polyacid can be present in the composition, reference to "a polybase" in a composition means that more than one polybase can be present in the composition, reference to "a polymer" includes combinations of different polymers, and the like.

The term "paper" or "paper substrate" is meant to encompass a substrate based on cellulosic fibers; synthetic fibers such as polyamides, polyesters, polyethylene, and polyacrylic fibers; inorganic fibers such as asbestos, ceramic, and glass fibers; and any combination of cellulosic, synthetic, and inorganic fibers. The paper substrate may be of any dimension (e.g., size or thickness) or form (e.g., pulp, wet paper, dry paper, etc.). In most instances, the "paper" or "paper substrate" has not been subjected to an external sizing process prior to treatment according to the methods of the invention. Where the paper substrate is used in external sizing, the paper substrate is preferably in the form of a flat or sheet structure, which structure may be of variable dimensions (e.g., size and thickness). "Paper," particularly as used in the context external sizing, is thus meant to encompass printing paper (e.g., inkjet printing paper, etc.), writing paper, drawing paper, and the like, as well as board materials such as cardboard, poster board, Bristol board, and the like.

The term "sheet" or "flat structure" is not meant to be limiting as to dimension, roughness, or configuration of the substrate useful with the present invention, but rather is meant to refer to a product suitable for external sizing.

"Sized paper substrate" is a paper substrate as described above that has applied to its surface and/or is saturated with one or more of the sizing compositions of the present invention. The sizing composition of the invention is preferably applied in an external sizing step, but may also be applied as a pretreatment (e.g., prior to printing), simultaneously with printing, or as an after-treatment. The sizing compositions of the invention are applied in quantities suitable to accomplish external sizing and to provide desired characteristics, such as bleed resistance, water resistance (e.g., water-fastness) of an ink printed on sized paper substrate, etc. Typical amounts of sizing composition applied generally range from about ten to about five hundred pounds per ton of paper substrate, preferably from about thirty to about five hundred pounds per ton of paper substrate.

"Aqueous based ink" refers to an ink composed of an aqueous carrier medium and a colorant, such as a dye or a pigment dispersion. An aqueous carrier medium is composed of water or a mixture of water and one or more water-soluble organic solvents. Exemplary aqueous based ink compositions are described in detail below.

"Colorant" as used herein is meant to encompass dyes, pigments, stains, and the like compatible for use with the polymer coatings of the invention.

The term "colorant-reactive component" as used herein refers to a component (e.g., a chemical moiety) of a sizing agent that is capable of reacting with a selected colorant, particularly a colorant having a nucleophilic and/or ionizable group, to form a sizing agent-colorant complex. The sizing agent-colorant complex is formed through either a covalent, electrostatic, or ionic association between the colorant-reactive component of the sizing agent and the colorant. When a sizing agent having a colorant-reactive component and a selected colorant from a sizing agent-colorant complex in the context of a printed image on a sized paper substrate, the association between the colorant and the color-reactive component of the sizing agent is effective to impart advantageous qualities to the printed image on the sized paper substrate (e.g., water resistance, enhanced optical density, and/or enhanced brightness).

The term "organic solvent" is used herein in its conventional sense to refer to a liquid organic compound, typically a monomeric organic material in the form of a liquid, preferably a relatively nonviscous liquid, the molecular structure of which contains hydrogen atoms, carbon atoms, and optionally other atoms as well, and which is capable of dissolving solids, gases or liquids.

The term "significant", as when used with reference to "significantly enhanced brightness" or "significantly improved water-fastness" generally refers to a difference in a quantifiable, measurable, or otherwise detectable parameter (e.g., optical density, LAB graphs (color sphere), dot spread, bleed through) between the two groups being compared (e.g., unsized versus sized paper substrates) that is statistically significant using standard statistical tests. For example, the degree of visual wicking or water-fastness in a sized paper substrate as detected in a print assay may be quantified using standard methods, and the degree of wicking or water-fastness under different conditions can be compared for both sized and unsized paper substrates to detect statistically significant differences.

The term "fluid resistance" is used herein to describe the resistance of a paper substrate to penetration by a fluid, with the term "water resistance" specifically referring to resistance of a paper substrate to penetration by a fluid.

The term "water-fast," is used herein to describe a form of water resistance, and which is normally used to refer to the nature of the ink composition after drying on a substrate. In general, "water-fast" means that the dried composition is substantially insoluble in water, such that upon contact with water, the dried ink retains at least about 70%, preferably at least about 85%, and more preferably at least about 95%, of optical density.

The term "bleed resistance" is meant to refer to the retardation of the penetration of water into paper, which retardation is associated with creation of a low energy hydrophobic surface at the fiber-water interface which increases the contact angle formed between a drop of liquid and the surface, and thus decreases the wettability. Contact angles have been shown to be sensitive to molecular packing, surface morphology, and chemical constitution of the paper substrate and any components added thereto.

The term "rub resistance" is normally meant to refer to a characteristic of the ink composition after drying on a substrate, more specifically, the ability of a printed image to remain associated with the substrate upon which it is printed despite application of force (e.g., rubbing) to the printed image. In general, "rub resistant" means that the dried ink composition is substantially resistant to rubbing force so that the dried ink retains at least about 70%, preferably at least about 85%, and more preferably at least about 95%, of optical density after rubbing of the printed image.

The term "alkyl" as used herein refers to a branched or unbranched saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like, as well as cycloalkyl groups such as cyclopentyl, cyclohexyl and the like. The term "lower alkyl" intends an alkyl group of 1 to 6 carbon atoms, preferably 1 to 4 carbon atoms.

The term "alkylene" as used herein refers to a difunctional, branched or unbranched saturated hydrocarbon group of 1 to 24 carbon atoms, including without limitation methylene, ethylene, ethane-1,1-diyl, propane-2,2-diyl, propane-1,3-diyl, butane-1,3-diyl, and the like. "Lower alkylene" refers to an alkylene group of 1 to 6 carbon atoms.

The term "alkenyl" as used herein refers to a branched or unbranched hydrocarbon group of 2 to 24 carbon atoms containing at least one carbon-carbon double bond, such as ethenyl, n-propenyl, isopropenyl, n-butenyl, isobutenyl, t-butenyl, octenyl, decenyl, tetradecenyl, hexadecenyl, eicosenyl, tetracosenyl and the like. Preferred alkenyl groups herein contain 2 to 12 carbon atoms and 2 to 3 carbon-carbon double bonds. The term "lower alkenyl" intends an alkenyl group of 2 to 6 carbon atoms, preferably 2 to 4 carbon atoms, containing one —C=C— bond. The term "cycloalkenyl" intends a cyclic alkenyl group of 3 to 8, preferably 5 or 6, carbon atoms.

The term "alkenylene" refers to a difunctional branched or unbranched hydrocarbon chain containing from 2 to 24 carbon atoms and at least one carbon-carbon double bond. "Lower alkenylene" refers to an alkenylene group of 2 to 6, more preferably 2 to 5, carbon atoms, containing one —C=C— bond.

The term "alkoxy" as used herein intends an alkyl group bound through a single, terminal ether linkage; that is, an "alkoxy" group may be defined as —OR where R is alkyl as defined above. A "lower alkoxy" group intends an alkoxy group containing 1 to 6 carbon atoms.

The term "aryl" as used herein refers to an aromatic species containing 1 to 3 aromatic rings, either fused or linked, and either unsubstituted or substituted with 1 or more substituents typically selected from the group consisting of lower alkyl, halogen, —NH$_2$ and —NO$_2$. Preferred aryl substituents contain 1 aromatic ring or 2 fused or linked aromatic rings.

"Halo" or "halogen" refers to fluoro, chloro, bromo or iodo, and usually relates to halo substitution for a hydrogen atom in an organic compound.

The prefix "poly-" as in "polyacid" or "polybase" is intended to mean that the compound so designated has two or more acidic groups or two or more basic groups, respectively. Thus, the term "polyacid" herein encompasses a diacid, and the term "polybase" herein encompasses a dibase.

The term "polymer" is used herein in its conventional sense to refer to a compound having two or more monomer units, and is intended to include homopolymers as well as copolymers. The term "monomer" is used herein to refer to compounds which are not polymeric.

"Optionally" or "optionally" means that the subsequently described event or circumstance may or may not occur, and that the description includes instances where said event or circumstance occurs and instances where it does not. For example, the phrase "optionally substituted" aromatic ring means that the aromatic ring may or may not be substituted and that the description includes both an unsubstituted aromatic ring and an aromatic ring bearing one or more substituents.

OVERVIEW OF THE INVENTION:

The present invention is based upon the discovery that a sizing composition containing a mixture of a polyacid and a polybase can be used in sizing a paper substrate to provide a superior product. Sized paper that has been treated with a sizing composition of the invention ultimately provides high quality printed images having improved color fastness (printed images which do not run when exposed to moisture) and exhibits substantially non-reversible binding of aqueous colorants. These images are therefore characterized as "water-resistant" or "water-fast" images due to the characteristics of the printed image following exposure to water.

The sized paper substrates of the invention can be used in conventional printing, or with digital printing (particularly inkjet printing, including drop-on-demand and continuous printing) to provide highly brilliant, printed images that are significantly improved in color quality, for example, with respect to chroma and hue, when compared to unsized paper substrates and/or to paper substrates sized with conventional sizing compositions. The sizing compositions and their methods of use according to the present invention thus provide a number of advantages over conventional sizing methods and sizing compositions.

The sizing compositions, methods of sizing using the sizing compositions described herein, and other features of the invention are described in greater detail below.

SIZING COMPOSITIONS:

The sizing compositions of the invention are composed of a sizing agent comprised of a mixture of a polyacid and a polybase. In general, the sizing agents have a colorant-reactive component, which is capable of reacting with a selected colorant, particularly a colorant having a nucleophilic and/or ionizable group, to form a sizing agent-colorant complex through a covalent, electrostatic, or ionic association. The association of the sizing agent and colorant imparts bleed resistance, water resistance (e.g., water-fastness), and other desirable characteristics to the printed sized paper substrate. In addition to the sizing agent, the sizing compositions can include components such as binders, pigments, and other additives.

The present sizing compositions can be readily prepared from commercially available starting materials and/or reagents, are compatible with additional binders or additives, can be used with a variety of base papers, and are compatible with a variety of printing methods, including conventional and digital printing methods (particularly ink-jet printing, including drop-on-demand printing and continuous printing), and can also be used with existing commercial paper production processes and equipment. The sizing composition is inexpensive to prepare, and due to their efficacy, generally less sizing agent is needed to provide a sized paper substrate having the advantageous features described herein. The sizing compositions of the invention are also easy to handle due to their solubility in water (i.e., the sizing agents are hydrophilic polymers), and do not require the use of large volumes of organic solvents. The novel sizing compositions herein also possess good film-forming properties.

The sized paper substrate prepared using the composition of the invention exhibits improved durability, as evidenced by improved paper strength (e.g., tear strength), and stability upon prolonged storage. The sized paper does not discolor or yellow, and maintains a high degree of brightness for extended periods of time. Paper substrates treated with the sizing compositions of the invention react rapidly and substantially irreversibly with a number of aqueous based colorants, thus providing a versatile sizing system for use with a wide variety of available colorants. Furthermore, because the colorant reacts quickly with the sizing compositions, the sized printed substrate does not require a separate curing step, but rather is fast-drying. This fast-drying characteristic provides for printed images that are "non-sticky," thus allowing the printed sized paper substrate to be handled immediately after printing, for example, to allowing stacking. The sized paper substrate of the invention can also be used to prepare images with varying degrees of gloss, depending upon variations in pigment.

In addition to their water resistance, paper substrates sized with a sizing composition of the invention are highly bleed-resistant (as evidenced by small dot size measurements, i.e., less wicking action) and rub-resistant.

The various components of the sizing compositions will now be described.

1. THE SIZING AGENT

Sizing agents in the sizing compositions comprise a mixture of a polyacid and a polybase. The sizing agent may be composed of any suitable combination of: 1) a monomeric polyacid and a monomeric polybase; 2) a polymeric polyacid and a polymeric polybase; 3) a polymeric polyacid and a monomeric polybase; and/or 4) a monomeric polyacid and a polymeric polybase. The selection of these combinations for use as a sizing agent according to the invention will vary according to a variety of factors such as the nature of the paper substrate to be sized, the colorant to be used in printing on the sized paper substrate, etc. The relative ratios of the polyacid and polybase within the mixture will also vary according such factors, but typically the ratio of base to acid is in the range of approximately 1:1 to 10:1, more typically in the range of approximately 1:1 to 3:1. These mixtures of monomeric and/or polymeric polyacids and polybases find use as either internal or external sizing agents. The sizing agent will generally represent approximately 5 wt. % to 95 wt. % of the sizing composition, typically 10 wt. % to 95 wt. % of the sizing composition, based upon total solids weight of the composition after drying.

In general, the pH of the sizing composition having a polyacid/polybase sizing agent is neutral or basic, preferably at least about pH 7 or higher. The pH is maintained by the addition of appropriate bases such as ammonia, primary, secondary, and tertiary alkyl amines, ethanolamines, diamine, and the like.

In general, monomeric polyacids will contain two or more carboxylic, sulfonic and/or phosphonic acid groups. Exemplary monomeric polyacids have the structural formula (I)

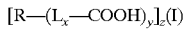

wherein: R is selected from the group consisting of alkyl, alkenyl, aryl of 1 to 3 rings which may be fused or linked, and 5- and 6-membered heterocyclic rings having from 1 to 3 heteroatoms selected from N, S and O; L is an alkylene or alkenylene chain containing 1 to 8 carbon atoms; x is 0 or 1; y is an integer in the range of 2 to 10 inclusive; and z is 1, 2 or 3, with the proviso that if z is 2 or 3, the distinct R groups are covalently linked to each other.

Specific examples of preferred monomeric polyacids include, but are not necessarily limited to, oxalic acid, maleic acid, succinic acid, methylsuccinic acid, malonic acid, adipic acid, glutaric acid, fumaric acid, dihydroxyfumaric acid, malic acid, mesaconic acid, itaconic acid, phthalic acid, isophthalic acid, terephthalic acid, 1,2-, 1,3- and 1,4-cyclohexane dicarboxylic acids, 1,2,3-cyclohexane tricarboxylic acid, 1,2,4-cyclohexane tricarboxylic acid, 1,3, 5-cyclohexane tricarboxylic acid, 1,2- and 1,3-cyclopentane dicarboxylic acids, citric acid, tartaric acid, dihydroxy-terephthalic acid, 1,2,3-, 1,2,4- and 1,2,5-benzene tricarboxylic acids, tricarballylic acid, 1,2,4,5-benzene tetracarboxylic acid, norbornene tetracarboxylic acid, 3,3', 4,4'-benzophenone tetracarboxylic acid, 1,2,3,4,5,6-benzene hexacarboxylic acid, aspartic acid, glutamic acid, and combinations thereof.

In general, monomeric polybases useful herein contain two or more primary, secondary or tertiary amino groups. Exemplary monomeric polybases have the structural formula (II)

wherein $R^5$ and $R^6$ are hydrogen, alkyl, alkoxy, or hydroxyl-substituted alkoxy, and R, L, x, y and z are as defined with respect to the monomeric polyacid.

Specific examples of monomeric polybases include, but are not limited to, ethylenediamine, 1,2-propane diamine, 1,3-propanediamine, 1,2,3-triaminopropane, cis-1,2-cyclohexanediamine, trans-1,2-cyclohexanediamine, 1,3-bis (aminomethyl)cyclohexane, o-, m-and p-phenylenediamine, tetramethyl o-, m- andp-phenylenediamine, hexamethylenediamine, hexamethylenetetraamine, diethylenetriamine, tetraethylenepentamine, pentaethylenehexamine, pentamethyl diethylenetriamine, tris(2-aminoethyl)amine, 1,1,4,7,10,10-hexamethyl triethylenetetramine, tetramethyl-p-phenylenediamine, tetramethylethylenediamine, triethylenetetraamine, 4,4'-bipyridyl, and combinations thereof.

The polymeric polyacids contain carboxylic, sulfonic and/or phosphonic acid groups, but most preferably contain carboxylic acid groups. Examples of polymeric polyacids include, without limitation, poly(acrylic acid), poly (acrylonitrile-acrylic acid), poly(styrene-acrylic acid), poly (butadiene-acrylonitrile acrylic acid), poly(butylacrylate-acrylic acid), poly(ethyl acrylate-acrylic acid), poly (methacrylate-acrylic acid), poly(methyl methacrylate-acrylic acid), poly(methyl methacrylate-styrene-acrylic acid), poly(vinyl pyrrolidone-acrylic acid), poly(styrene-co-maleic acid), poly(methyl methacrylate-styrene-co-maleic), poly(ethylene-propylene-acrylic acid), poly(propylene-acrylic acid), alginic acid, phytic acid, and combinations thereof.

The polymeric polybases comprise nitrogenous polymers that may have pendant primary, secondary or tertiary amine groups and/or nitrogenous moieties in the backbone, i e., -NH- or -NR- groups. Exemplary polymeric polybases include, but are not limited to, polyethyleneimine, polyvinylpyridine, polyallylamine (including N-alkylated and N,N-dialkylated polyallylamines), polyvinylaziridine, polyimidazole, polylysine, chitosan, poly(amino and alkylated amino)ethylenes, ethoxylated polyethyleneimine, propoxylated polyethyleneimine, and combinations thereof.

2. FILM-FORMING BINDERS

The sizing compositions of the invention preferably include a film-forming binder. By "film-forming binder" is meant a substance that provides for improved strength of a paper substrate upon application of the substance to the substrate. "Film-forming binders" used in connection with the sizing compositions of the invention include any film-forming binder that is compatible with the sizing agent of the composition. Exemplary film-forming binders include, but are not necessarily limited to: polysaccharides and derivatives thereof, e.g., starches, cellulosic polymers, dextran and the like; polypeptides (e.g., collagen and gelatin); and synthetic polymers, particularly synthetic vinyl polymers such as poly(vinyl alcohol), poly(vinyl phosphate), poly(vinyl pyrrolidone), vinyl-pyrrolidone-vinyl acetate copolymers, vinyl acetate-acrylic acid copolymers, vinyl alcohol-vinyl acetate copolymers, vinyl pyrrolidone-styrene copolymers, and poly(vinylamine), synthetic acrylate polymers and copolymers such as poly(acrylic acid-co-methacrylate), poly (vinyl-co-acrylate), and the like, and water-soluble or water-dispersible polyesters such as sulfopolyesters (e.g., as available from Eastek). The sizing agents herein are themselves film-forming substances; however, it is generally desirable to use these sizing agent compositions with additional film-forming substances.

Polysaccharide binders: Starches, as noted above, represent one category of suitable film-forming binders for use herein. Suitable starches may be any of a variety of natural, converted, and synthetically modified starches. Exemplary starches include, but are not necessarily limited to starch (e.g., SLS-280 (St. Lawrence Starch)), cationic starches (e.g., Cato-72 (National Starch), hydroxylalkylstarch, wherein the alkyl has at least one carbon atom and wherein the number of carbon atoms is such that the material is water soluble, preferably from about 1 to about 10 carbon atoms, such as methyl, ethyl, propyl, butyl, or the like (e.g., hydroxypropyl starch #02382 (PolySciences, Inc.), hydroxyethyl starch #06733 (PolySciences, Inc.), Penford Gum 270 and 280 (Penford), and Film-Kote (National Starch)), starch blends (see, e.g., U.S. Pat. No. 4,872,951, describing a blend of cationic starch and starch treated with an alkyl or alkenyl succinic anhydride (ASA), preferably 1-octenyl succinic anhydride (OSA)), and the like. The film-forming binder can also be a synthetically produced polysaccharide, such as a cationic polysaccharide esterified by a dicarboxylic acid anhydride (see, e.g., U.S. Pat. No. 5,647,898). Additional saccharide binders include cellulosic materials such as alkyl celluloses, aryl celluloses, hydroxy alkyl celluloses, alkyl hydroxy alkyl celluloses, hydroxy alkyl celluloses, dihydroxyalkyl cellulose, dihydroxyalkyl cellulose, hydroxy alkyl hydroxy alkyl cellulose, halodeoxycellulose, amino deoxycellulose, dialkylammonium halide hydroxy alkyl cellulose, hydroxyalkyl trialkyl ammonium halide hydroxyalkyl cellulose, dialkyl amino alkyl cellulose, carboxy alkyl cellulose salts, cellulose sulfate salts, carboxyalkylhydroxyalkyl cellulose and the like). Still additional film-forming binders of this type include dextran (e.g., dialkyl aminoalkyl dextran, amino dextran, and the like), carrageenan, Karaya gum, xanthan, guar and guar derivatives, (e.g., carboxyalkyl hydroxyalkyl guar, cationic guar, and the like), and gelatin.

Additional exemplary film-forming binders for use in the sizing compositions of the invention include resins (e.g., such as formaldehyde resins such as melamine-formaldehyde resin, urea-formaldehyde resin, alkylated urea-formaldehyde resin, and the like ), ionic polymers (e.g., poly(2-acrylamide-2-methyl propane sulfonic acid, poly(N, N-dimethyl-3,5-dimethylene piperidinium chloride, poly (methylene-guanidine), and the like), maleic anhydride and maleic acid-containing polymers (e.g., styrene-maleic anhydride copolymers, vinyl alkyl ether-maleic anhydride copolymers, alkylene-maleic anhydride copolymers, butadiene-maleic acid copolymers, vinylalkylether-maleic acid copolymers, alkyl vinyl ether-maleic acid esters, and the like), acrylamide-containing polymers (e.g., poly (acrylamide), acrylamide-acrylic acid copolymers, poly(N, N-dimethylacrylamide), and the like), poly(alkyleneimine)-containing polymers (e.g., poly(ethyleneimine), poly (ethyleneimine) epichlorohydrin, alkoxylated poly(ethylene imine), and the like), polyoxyalkylene polymers (e.g., poly (oxymethylene), poly(oxyethylene), ethylene oxide/ propylene oxide copolymers, ethylene oxide/2-hydroxyethyl methacrylate/ethylene oxide and ethylene oxide/ hydroxypropyl methacrylate/ethyleneoxide triblock copolymers, ethylene oxide-4-vinyl pyridine/ethylene oxide triblock copolymers, ethylene oxide-isoprene/ethylene oxide triblock copolymers, epichlorohydrin-ethylene oxide copolymer, and the like), etc.

Any suitable mixtures of the above exemplary film-forming binders can be used in any effective relative amounts, although typically the film-forming binder, if present, represents approximately 1 wt. % to 40 wt. % , preferably 1 wt. % to 25 wt. % , most preferably 1 wt. % to 15 wt. % of the composition, after drying on a substrate. Starches and latexes are of particular interest because of their availability and applicability to paper.

3. OTHER SIZING COMPOSITION COMPONENTS

Additional sizing composition components may include, but are not necessarily limited to, inorganic fillers, anti-curl agents, or additional conventional components such as a surfactant, plasticizer, humectant, UV absorber, light fastness enhancer, polymeric dispersant, dye mordant, optical brightener, or leveling agent, as are commonly known in the art. Illustrative examples of such additives are provided in U.S. Pat. Nos. 5,279,885 and 5,537,137. The sizing compositions may additionally contain a colorant (e.g., a pigment, dye (e.g., ionizable dye, nucleophilic dye, etc.), or other colorant) to provide for whiteness or color of the sized paper substrate. The sizing compositions may also further include a crosslinking agent, such as zirconium acetate, ammonium zirconium carbonate, or the like, for intramolecular and/or intermolecular crosslinking of sizing agent(s) in the sizing composition and/or a chelating agent such as boric acid. Additional components that may be desirable for use in the sizing compositions of the invention, as well as guidance for the use of such components and a general description of paper chemistry, are found in *PAPER CHEMISTRY*, $2^{nd}$ Edition, Roberts, ed., Blackie Academic & Professional, Glasgow, UK (1994).

The sizing composition will generally be provided in an aqueous liquid vehicle, although small amounts of a water-soluble organic solvent may be present. The aqueous liquid vehicle will generally be water, although other nonorganic compounds which are either water soluble or water miscible may be included as well. It may on occasion be necessary to add a solubilizing compound during preparation of the sizing composition so that the components dissolve in the aqueous liquid vehicle, e.g., an inorganic base such as ammonia and/or an organic amine. Suitable organic amines include lower alkyl-substituted amines such as methylamine, dimethylamine, ethylamine, and trimethylamine, as well as ethanolamine, diethanolamine, triethanolamine, and substituted ethanolamines, typically lower alkyl-substituted ethanolamines such as N-methyl and N,N-dimethyl ethanolamines, and morpholine. Such compounds are also useful for bringing the pH into the desired range for basic formulations, and, if present, will generally represent not more than about 20 wt. % of the composition, and in most cases will represent not more than about 10 wt. % of the composition.

APPLICATION OF SIZING COMPOSITIONS TO PAPER SUBSTRATES:

The sizing compositions of the invention can be applied to a substrate, e.g., a paper substrate, by any of a number of conventional processes commonly employed in the art. Generally, the sizing compositions of the invention are applied by means of a rod, roll, flexopress, blade, or air-knife coater in amounts ranging from about 10 to 500, preferably 30 to 500, pounds per ton of substrate. For external sizing, the sizing composition is applied to a paper substrate to achieve a desired sizing composition layer thickness selected according to the particular application. Application of a coating in a selected thickness can readily be done by one of skill in the art using known techniques, for example, by varying the sizing agent concentration and number of coatings and through selection of the application means.

The sizing composition as described above is applied to any desirable paper substrate, usually to a type of paper substrate commonly used in printing. Substrates for use in the invention include cellulose and non-cellulose type substrates (e.g., synthetic fibers such as polyamides, including nylon, polyesters, polyethylene, and polyacrylic fibers; protein-based fibers such as silk; inorganic fibers such as asbestos, ceramic, and glass fibers), and/or any combination of cellulosic, synthetic, and inorganic fibers, with porous cellulose substrates being preferred. Preferred substrate for use herein is generally free cut sheet paper, with exemplary paper substrates including, but not limited to, copier grade paper, business card stock, resin-coated papers, cartons such as milk cartons and cardboard gift boxes. Additional exemplary substrates for use in the invention include polyester films such as "MYLAR" flexible film, polysulfones, cellulose triacetates, and the like. Coated transparent films are also contemplated.

SIZING PROCESSES:

In general, sizing encompasses both internal and external sizing. "Internal sizing" generally involves introduction of sizing compositions at the pulp stage of paper manufacturing, resulting in the distribution of the sizing composition within the fibrous mass subsequently used to produce a flat fibrous structure, e.g., a sheet of paper. "External sizing," also called surface application, pasting, saturating, or coating, involves application of a sizing composition to at least one surface of a flat fibrous paper structure, so that the sizing composition is present on or in at least one of the two faces of the flat fibrous paper. External sizing also saturates the paper to various extents depending on the degree of internal sizing.

Internal sizing processes are well known in the art. Generally, internal sizing is accomplished by adding the sizing agent to the pulp, preferably with continuous mixing at the dosing point. In general, the external sizing process of the invention involves application of a sizing composition of the invention to a surface of a paper substrate. Any suitable technique can be used for application of the sizing compositions of the invention as an internal or external sizing agent for a paper substrate. Exemplary external sizing techniques include, but are not necessarily limited to, size press treatment, dip coating, reverse roll coating, extrusion coating, and the like. For example, the sizing composition can be applied with a size press by dip coating and can be applied by solvent extrusion. The size press can be a sheet-fed size press or a size press employing a continuous web, preferably a continuous web size press.

The invention also features a paper substrate that has been sized using the sizing compositions and methods of the invention as described above. As noted in the preceding section, the sized paper substrate may be cellulosic or non-cellulosic, and may comprise any combination of cellulosic, synthetic and inorganic fibers. The sized paper substrate may be of any size and is preferably in the form of a flat or sheet structure, which may be of variable dimensions. Of Particular interest in the present invention are sized paper substrates that are suitable for use in as inkjet printing paper, writing paper, drawing paper, and the like.

METHOD FOR PROVIDING WATER-RESISTANT IMAGES ON PAPER:

The invention also features a method for providing a water-resistant (e.g., water-fast) image on paper by first applying to the surface of a paper substrate a sizing composition of the invention to the surface of a paper substrate to produce a sized substrate, and then applying a colorant to the sized substrate, where the colorant contains reactive ionizable and/or nucleophilic groups capable of reacting with the sizing agent.

In general, aqueous inks are used in the preparation of a printed image on the sized paper substrates of the invention. The aqueous ink may be any suitable ink having a colorant, e.g. a pigment, dye, or stain, having one or more reactive groups suitable for reacting, either covalently or ionically, with a colorant-reactive component of a sizing agent of the sizing composition present on the sized paper substrate. The selection of the specific ink and the colorant of the ink can vary with colorant-reactive component of the sizing agent used in the sizing composition. Preferred colorants for use in printing on a substrate treated with the present sizing compositions are those containing one or more ionizable or nucleophilic moieties, e.g., having an amino, carboxy, sulfonato, thiosulfonato, cyano, hydroxy, halo, phosphonato or sulfido group or the like.

Preferably, the inks used in conjunction with the sized paper substrate of the invention are inkjet inks. Water-soluble colorants for use in the invention may be acid dyes, direct dyes, basic dyes or dispersive dyes, and preferred dyes for use in the invention are described in U.S. Pat. Nos. 5,425,805, 5,537,137, and 5,441,561.

The selection of the aqueous based ink will depend upon the requirements of the specific application, such as desired surface tension, viscosity, drying time, the type of paper substrate upon which the ink is to be applied (printing medium), and the like. The aqueous liquid vehicle of inks suitable for use in the invention will generally be deionized water, although other nonorganic compounds which are either water soluble or water miscible may be included as well. The colorant may be dissolved, dispersed or suspended in the aqueous liquid vehicle, and is present in an amount effective to provide the dried ink with the desired color and color intensity.

In some instances, the dye is contained in a carrier medium composed of ink and a water soluble organic solvent. For applications utilizing such a carrier medium, representative solvents include polyols such as polyethylene alcohol, diethylene glycol, propylene glycol, and the like. Additional solvents are simple alcohols such as ethanol, isopropanol and benzyl alcohol, and glycol ethers, e.g., ethylene glycol monomethyl ether, diethylene glycol monoethyl ether. Representative examples of water soluble organic solvents are described in U.S. Pat. No. 5,085,698 and U.S. Pat. No. 5,441,561.

Preferred colorants contained in the inks useful with the invention are dyes, including azo or "direct" dyes as well as dyes containing acidic groups (e.g., carboxylate, phosphonate or sulfonate moieties), basic groups (e.g., unsubstituted amines or amines substituted with 1 or 2 alkyl, typically lower alkyl, groups), or both. Specific examples of suitable colorants include, but are not limited to, the following: Dispersol Blue Grains (Zeneca, Inc.), Duasyn Acid Blue (Hoechst Celanese), Duasyn Direct Turquoise Blue (Hoechst Celanese), Phthalocyanine blue (C.I. 74160), Diane blue (C.I. 21180), Pro-jet Cyan 1 (Zeneca, Inc.), Pro-jet Fast Cyan 2 (Zeneca, Inc.), Milori blue (an inorganic pigment equivalent to ultramarine) as cyan colorants; Dispersol Red D-B Grains (Zeneca, Inc.), Brilliant carmine 6B (C.I. 15850), Pro-jet magenta 1 (Zeneca, Inc.), Pro-jet Fast magenta 2 (Zeneca, Inc.), Brilliant Red F3B-SF (Hoechst Celanese), Red 3B-SF (Hoechst Celanese), Acid Rhodamine (Hoechst Celanese), Quinacridone magenta (C.I. Pigment Red 122) and Thioindigo magenta (C.I. 73310) as magenta colorants; Dispersol Yellow D-7G 200 Grains (Zeneca, Inc.), Brilliant yellow (Hoechst Celanese), Pro-jet yellow 1 (Zeneca, Inc.), Pro-jet Fast Yellow 2 (Zeneca, Inc.), benzidine yellow (C.I. 21090 and C.I. 21100) and Hansa Yellow (C.I. 11680) as yellow colorants; organic dyes; and black materials such as carbon black, charcoal and other forms of finely divided carbon, iron oxide, zinc oxide, titanium dioxide, and the like. Specific and preferred black colorants include Acid Black 48 (Aldrich), Direct Black 58756 A (Crompton & Knowles), BPI Molecular Catalytic Gray (Brain Power), Fasday Cool Gray (Hunter elator), Dispersol Navy XF Grains (Zeneca, Inc.), Dispersol Black CR-N Grains (Zeneca, Inc.), Dispersol Black XF Grains (Zeneca, Inc.), Disperse Black (BASF), Color Black FW18 (Degussa), Color Black FW200 (Degussa), Hostafine Black TS (Hoechst Celanese), Hostafine Black T (Hoechst Celanese), Duasyn Direct Black (Hoechst Celanese), Pro-jet Black 1 (Zeneca, Inc.) and Pro-jet Fast Black 2 (Zeneca, Inc.).

PRINTED PAPER:

The invention also features a printed, sized paper substrate produced using the methods and compositions described herein. The printed, sized paper substrate of the invention can be produced by any of a variety of printing techniques, including inkjet printing, laserjet printing, photocopying, and the like. In general, the printing process involves applying an aqueous recording liquid to a sized paper substrate in an imagewise pattern. Inkjet printing processes are well known in the art; see, for example, U.S. Pat. Nos. 4,601,777; 4,251,824; 4,410,899; 4,412,224; and 4,532,530.

The sized paper substrates of the invention can also be used in printing and/or copying process using dry or liquid electrophotographic-type developers, such as electrophotographic processes, ionographic process, and the like. The sized paper substrates of the invention can additionally be used in a process for generating images that involves generating an electrostatic latent image on an imaging member in an imaging apparatus, developing the latent image with a toner, transferring the developed image to a sized paper substrate of the invention. Electrophotographic processes are known in the art; see, e.g., U.S. Pat. No. 2,297,691. Ionographic and electrographic processes are also well known in the art; see, e.g., U.S. Pat. Nos. 3,611,419; 3,564,556; 4,240,084; 4,569,584; 2,919,171; 4,524,371; 4,619,515; 4,463,363; 4,254,424; 4,538,163; 4,409,604; 4,408,214; 4,365,549; 4,267,556; 4,160,257; and 4,155,093.

The sized paper substrate of the invention can also be used in any other printing or imaging processes, such as offset printing, printing with pen plotters, handwriting with ink pens, and the like.

EXPERIMENTAL

The following examples are put forth so as to provide those of ordinary skill in the art with a complete disclosure and description of how to prepare and use the compounds disclosed and claimed herein. Efforts have been made to ensure accuracy with respect to numbers (e.g., amounts, temperature, etc.) but some errors and deviations should be accounted for. Unless indicated otherwise, parts are parts by weight, temperature is in ° C. and pressure is at or near atmospheric Also, in these examples, unless otherwise stated, the abbreviations and terms employed have their generally accepted meanings. Abbreviations and tradenames are as follows (note that suppliers of each material are indicated as well):

AR74=vinyl acetate/acrylic copolymer, 45% aqueous solution (Rohm & Haas);

Boric Acid=boric acid/ammonium hydroxide solution (Aldrich);

Carboset=polyacrylic acid (Carboset GA 1594, B.F. Goodrich);

Eastek=Eastek 1100 polymer (Eastman);

EPEI=ethoxylated polyethylene imine (37% , Aldrich);

Gum 280 =starch (Penford Gum 280, Penford);

Jetcoat 20=25% calcium carbonate in water (Specialty Minerals);

Sif=fumed silica (Aerosil MOX 170, Air Products);

Sip=precipitated silica (FK310, Degussa);

SMA=styrene-maleic anhydride copolymer (Georgia Pacific);

Tinopal=brightener (Ciba Additives);

Unicrepe=adipic acid-diethylenetriamine copolymer (Georgia Pacific).

All patents, patent applications, journal articles and other references mentioned herein are incorporated by reference in their entireties.

EXAMPLE 1

MIXING PROCEDURES FOR ACID-BASE, NO-STARCH SYSTEMS

An exemplary acid-base sizing agent formulation was prepared according to the following:

TABLE 1

EXAMPLE OF ACID-BASE, NO STARCH FORMULATION

| Component | % Solid | Wet gm used |
|---|---|---|
| 10% SMA | 8.8 | 81.2 |
| 35.4% UNICREPE | 39.1 | 28 |
| 37% EPEI | 39.1 | 7.9 |
| 45% AR74 | 14% | 2.7 |
| $NH_3$ (pH adjuster) | 7.8 | 1.2 |
| Water | balance | 2.2 |
| 1-Octanol (defoamer) | trace | |

The acid, base and stearic maleic anhydride were mixed together with constant stirring in an appropriate amount of water. The resulting mixture was rather thick. However, upon addition of ammonia, the mixture became less viscous. The polymer (AR74) and a drop of defoamer were then blended in and the resulting mixture was stirred for another half hour before coating onto a paper substrate.

EXAMPLE 2

ACID/BASE SYSTEMS

The following tables summarize exemplary sizing compositions based on the acid/base systems of the invention (Tables 2 through 6). Each of the representative formulations was effective to produce a sized substrate having the beneficial features described herein, i.e., with respect to bleeding, wicking and water-fastness.

TABLE 2

ACID/BASE SIZE PRESS COATINGS WITHOUT STARCH

| Formulation No. | Resin 1 (SMA) | Resin 2 | EPEI | Binder (AR74) | Boric Acid in NH$_4$OH | Pigment (1:4Sif:Sip) | Solids (%) |
|---|---|---|---|---|---|---|---|
| 5-2 | 21.4 | | 7.1 | | | 71.4 | 12.7 |
| 4-1 | 30.5 | | 10.2 | 8.4 | | | 17.9 |
| 6-1 | 40.6 | | 40 | 8.6 | 10.1 | | 2.4 |
| 2-4 | 62.5 | | 20.8 | 16.7 | | | 8.6 |
| 2-3 | 65.9 | | 22 | | 12.1 | | 8.2 |
| 2-2 | 50 | Carboset, 16.7 | 16.7 | | | | 9.5 |
| 4-2 | 30 | Carboset, 10.0 | 10 | | | | 18.2 |
| 7-1 | 23.8 | Unicrepe, 71.4 | | 4.8 | | | 8.4 |
| 9-1 | 23.8 | Unicrepe, 71.4 | | 4.8 | | | 4.2 |
| 9-2 | 21.3 | Unicrepe, 63.8 | | 4.3 | 10.6 | | 4.6 |
| 8-1 | 42.4 | Unicrepe, 42.4 | 15.2 | | | | 8.2 |
| 8-2 | 39.1 | Unicrepe, 39.1 | 14 | 7.8 | | | 8.8 |
| 8-3 | 39.1 | Unicrepe, 39.1 | 14 | 7.8 | | | 4.4 |
| 8-4 | 36.1 | Unicrepe, 36.1 | 12.9 | 7.2 | 7.2 | | 4.7 |
| 16-1 | 12.2 | Ethoxylated Unicrepe, 87.8 | | | | | 8.2 |
| 16-2 | 11.9 | Ethoxylated Unicrepe, 85.7 | | 2.4 | | | 4.2 |
| 16-3 | 11.4 | Ethoxylated Unicrepe, 81.8 | | 2.3 | 4.5 | | 4.3 |
| 17-1 | 13.9 | Ethoxylated Unicrepe, 83.3 | | 2.8 | | | 14.4 |
| 18-1 | 30.3 | | 60.6 | 6 | 3 | | 4.4 |

TABLE 3

ACID/BASE SIZE PRESS COATINGS WITH STARCH

| Formulation No. | Starch (Gum 280) | Resin 1 (SMA) | Resin 2 (Unicrepe) | Binder (PVOH) | Eastek (1100) Polymer | Pigment 1:4 Sif:Sip | Solids (%) | Tinopal | pH |
|---|---|---|---|---|---|---|---|---|---|
| 70-1 | 22 | 1.6 | 34.4 | 9.4 | | 32.7 | 20.6 | | 8.38 |
| 70-3 | 22 | 1.6 | 34 | 9.4 | | 32.8 | 25.7 | | 7.32 |
| 70-2 | 22 | 1.6 | 34.4 | | 9.4 | 32.7 | 25.1 | | 8.46 |
| 72-1 | 35 | 1.5 | 21.5 | | 10.0 | 32.0 | 20.5 | | 9.20 |
| 71-3 | 30.5FK | 1.6 | 34.4 | | 10.0 | 28.0 | 20.7 | | |

TABLE 4

ACID/BASE SIZE PRESS COATINGS WITH STARCH

| Formulation No. | Starch (Gum 270) | Resin 1 (SMA) | Resin 2 (Unicrepe) | Ammonia | Pigment (Jetcoat 20) | Solids (%) | Tinopal | pH |
|---|---|---|---|---|---|---|---|---|
| 94-2 | 24.6 | 3.0 | 3.0 | | 69.4 | 19.2 | | |
| 94-3 | 18.6 | 3.0 | 9.0 | trace | 69.4 | 18.9 | | |
| 94-4 | 27.8 | 3.0 | 3.0 | trace | 66.2 | 18.7 | | |
| 94-5 | 27.8 | 3.0 | 9.0 | trace | 60.2 | 18.6 | | |
| 94-6 | 27.8 | 1.0 | 6.0 | trace | 65.2 | 17.0 | | |
| 94-7 | 20.0 | 5.0 | 5.0 | | 68.0 | 15.3 | 2.0 | |
| 94-8 | 20.0 | 5.0 | 15.0 | trace | 58.0 | 15.5 | 2.0 | |

TABLE 5

ACID/BASE SIZE PRESS COATINGS WITH STARCH

| Formulation No. | Starch (Gum 280) | Resin 1 (Carboset) | Resin 2 (EPEI) | Zr | Pigment (Jetcoat 20) |
|---|---|---|---|---|---|
| 31-1 | 18.6 | 3 | 9 | | 69.4 |
| 32-1 | 18.6 | 3 | 9 | 4.4 | 65 |

EXAMPLE 3
MIXING PROCEDURES FOR TWO-FEED SYSTEM

A two-feed system was used to prepare a sizing composition having the components set forth in Table 6.

TABLE 6

| Component | Formulation No. 94-2 | Formulation No. 94-5 | Formulation No. 94-6 |
|---|---|---|---|
| SMA:Unicrepe Ratio | 1:1 | 1:3 | 1:6 |
| SMA | 3.0 | 3.0 | 1.0 |
| Unicrepe | 3.0 | 9.0 | 6.0 |
| Ammonia | 0.0 | trace | trace |
| Starch (Gum 270) | 24.6 | 27.8 | 27.8 |
| Pigment (Jetcoat 20) | 69.4 | 60.2 | 65.2 |
| Water, mL | 0.0 | 1.0 | 7.0 |
| % Solid | 19.2 | 18.6 | 17.0 |

Stock starch and polyvinyl alcohol solutions were prepared separately by dissolving the dry powders in water. The mixtures were well agitated and heated slowly until all the solid dissolved to form clear transparent mixtures. The pH of the individual ingredients was measured; if below 9.0, it was adjusted with $NH_3$. If the pH dropped below 9 at any point of the mixing, the pH was adjusted with $NH_3$ to maintain a basic pH. If too much foam was observed, a few drops of defoamer were added.

Some defoamer was added to SMA While stirring, the pH-adjusted UNICREPE™ was slowly mixed in with the SMA to provide a smooth thick mixture. If the mixture was not smooth and thick, additional $NH_3$ was added. The pH adjusted PVOH was slowly mixed into the SMA-UNICREPE™ mixture with stirring. The pH adjusted Jetcoat was then slowly mixed in with stirring.

Defoamer was added to the pH-adjusted starch, and then was slowly mixed into the SMA-UNI-PVOH-Jetcoat mixture with stirring. The resulting mixture was well mixed for half an hour before coating.

What is claimed is:

1. In an internal sizing process for manufacturing a sized paper product using a sizing composition, the improvement which comprises using as a sizing agent in the sizing composition a combination of a monomeeric or polymeric polyacid containing two or more carboxylic, sulfonic and/or phosphonic acid groups and a monomeric polybase containing two or more primary, secondary and/or tertiary amine groups.

2. The process of claim 1, wherein the polyacid is monomeric.

3. A paper product sized by the process of claim 2.

4. The process of claim 2, wherein the monomeric polyacid has the structural formula

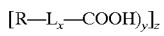

wherein:
R is selected from the group consisting of alkyl, alkenyl, aryl of 1 to 3 rings which may be fused or linked, and 5- and 6-membered heterocyclic rings having from 1 to 3 heteroatoms selected from N, S and O;
L is an alkylene or alkenylene chain containing 1 to 8 carbon atoms;
x is 0 or 1;
y is an integer in the range of 2 to 10 inclusive; and
z is 1,2 or 3,
with the proviso that if z is 2 or 3, the distinct R groups are covalently linked to each other, and the monomeric polybase has the structural formula

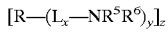

wherein $R^5$ and $R^6$ are hydrogen, alkyl, alkoxy, or hydroxyl-substituted alkoxy, and R, L, x, y and z are as defined with respect to the monomeric polyacid.

5. The process of claim 4, wherein the monomeric polyacid is selected from the group consisting of oxalic acid, maleic acid, succinic acid, methylsuccinic acid, malonic acid, adipic acid, glutaric acid, fumaric acid, dihydroxyfumaric acid, malic acid, mesaconic acid, itaconic acid, phthalic acid, isophthalic acid, terephthalic acid, 1,2-, 1,3- and 1,4-cyclohexane dicarboxylic acids, 1,2,3-cyclohexane tricarboxylic acid, 1,2,4-cyclohexane tricarboxylic acid, 1,3,5-cyclohexane tricarboxylic acid, 1,2- and 1,3-cyclopentane dicarboxylic acids, citric acid, tartaric acid, dihydroxyterephthalic acid, 1,2,3-, 1,2,4- and 1,2,5-benzene tricarboxylic acids, tricarballylic acid, 1,2,4,5-benzene tetracarboxylic acid, norbornene tetracarboxylic acid, 3,3',4,4'-benzophenone tetracarboxylic acid, 1,2,3,4,5,6-benzene hexacarboxylic acid, aspartic acid, glutamic acid, and combinations thereof.

6. The process of claim 4, wherein the monomeric polybase is selected from the group consisting of ethylenediamine, 1,2-propane diamine, 1,3-propanediamine, 1,2,3-triaminopropane, cis- 1,2-cyclohexanediamine, trans-1,2-cyclohexanediamine, 1,3-bis (aminomethyl)cyclohexane, o-, m- and p-phenylenediamine, tetramethyl o-, m- and p-phenylenediamine, hexamethylenediamine, hexamethylenetetraamine, diethylenetriamine, tetraethylenepentamine, pentaethylenehexamine, pentamethyl diethylenetriamine, tris(2-aminoethyl)amine, 1,1,4,7,10,10-hexamethyl triethylenetetramine, tetramethyl-p-phenylenediamine, tetramethylethylenediamine, triethylenetetraamine, 4,4'-bipyridyl, and combinations thereof.

7. The process of claim 5, wherein the monomeric polybase is selected from the group consisting of ethylenediamine, 1,2-propane diamine, 1,3-propanediamine, 1,2,3-triaminopropane, cis- 1,2-cyclohexanediamine, trans-1,2-cyclohexanediamine, 1,3-bis (aminomethyl)cyclohexane, o-, m- and p-phenylenediamine, tetramethyl o-, m- and p-phenylenediamine, hexamethylenediamine, hexamethylenetetraamine, diethylenetriamine, tetraethylenepentamine, pentaethylenehexamine, pentamethyl diethylenetriamine, tris(2-aminoethyl)amine, 1,1,4,7,10,10-hexamethyl triethylenetetramine, tetramethyl-p-phenylenediamine, tetramethylethylenediamine, triethylenetetraamine, 4,4'-bipyridyl, and combinations thereof.

8. The process of claim 1, wherein the polyacid is polymeric.

9. A paper product sized by the process of claim 8.

10. The process of claim 8, wherein the polymeric polyacid is a carboxylic acid-containing polymer, and the monomeric polybase has the structural formula $$[R\text{—}(L_x\text{—}NR^5R^6)_y]_z$$

wherein:
R is selected from the group consisting of alkyl, alkenyl, aryl of 1 to 3 rings which may be fused or linked, and 5- and 6-membered heterocyclic rings having from 1 to 3-heteroatoms selected from N, S and O;
L is an alkylene or alkenylene chain containing 1 to 8 carbon atoms;
x is 0 or 1;
y is an integer in the range of 2 to 10 inclusive;
z is 1,2 or 3; and
$R^5$ and $R^6$ are hydrogen, alkyl, alkoxy, or hydroxyl-substituted alkoxy,
with the proviso that if z is 2 or 3, the distinct R groups are covalently linked to each other.

11. The process of claim 10, wherein the polymeric polyacid is selected from the group consisting of poly(acrylic acid), poly(acrylonitrile-acrylic acid), poly(styrene-acrylic acid), poly(butadiene-acrylonitrile acrylic acid), poly(butylacrylate-acrylic acid), poly(ethyl acrylate-acrylic acid), poly(ethylene-propylene-acrylic acid), poly(propylene-acrylic acid), alginic acid, phytic acid, and combinations thereof, and the monomeric polybase is selected from the group consisting of ethylenediamine, 1,2-propane diamine, 1,3-propanediamine, 1,2,3-triaminopropane, cis-1,2-cyclohexanediamine, trans-1,2-cyclohexanediamine, 1,3-bis(aminomethyl)cyclohexane, o-, m- and p-phenylenediamine, tetramethyl o-, m- and p-phenylenediamine, hexamethylenediamine, hexamethylenetetraamine, diethylenetriamine, tetraethylenepentamine, pentaethylenehexamine, pentamethyl diethylenetriamine, tris(2-aminoethyl)amine, 1,1,4,7,10,10-hexamethyl triethylenetetramine, tetramethyl-p-phenylenediamine, tetramethylethylenediamine, triethylenetetraamine, 4,4'-bipyridyl, and combinations thereof.

12. In an internal sizing process for manufacturing a sized paper product using a sizing composition, the improvement which comprises using as a sizing agent in the sizing composition a combination of a monomeric or polymeric polyacid containing two or more carboxylic, sulfonic and/or phosphonic acid groups and a polymeric polybase comprised of a nitrogenous polymer selected from the group consisting of: (a) polymers containing two or more primary amine groups, secondary amine groups and/or tertiary amine groups; (b) polyyimines; (c) polymers containing two or more three- to five-membered nitrogen-containing heterocycles; and (d) combinations thereof.

13. The process of claim 1 or claim 12, wherein the sizing composition is aqueous.

14. The process of claim 1 or claim 12, wherein the sizing composition includes a film-forming binder which represents approximately 1 wt. % to 40 wt. % of the composition.

15. The process of claim 14, wherein the film-forming binder represents approximately 1 wt. % to 25 wt. % of the composition.

16. The process of claim 15, wherein the film-forming binder represents approximately 1 wt. % to 15 wt. % of the composition.

17. The process of claim 14, wherein the film-forming binder comprises a polysaccharide, polypeptide, or synthetic vinyl polymer.

18. The process of claim 17, wherein the film-forming binder is comprised of a polysaccharide.

19. The process of claim 18, wherein the polysaccharide is starch.

20. The process of claim 19, wherein the polysaccharide is a cellulosic polymer.

21. The process of claim 19, wherein the polysaccharide is dextran.

22. The process of claim 17, wherein the film-forming binder is a polypeptide.

23. The process of claim 22, wherein the polypeptide is selected from the group consisting of collagen and gelatin.

24. The process of claim 17, wherein the film-forming binder is a synthetic vinyl polymer.

25. The process of claim 24, wherein the synthetic vinyl polymer is selected from the group consisting of poly(vinyl alcohol), poly(vinyl phosphate), poly(vinyl pyrrolidone), vinyl-pyrrolidone-vinyl acetate copolymers, vinyl acetate-acrylic acid copolymers, vinyl alcohol-vinyl acetate copolymers, vinyl pyrrolidone-styrene copolymers, and poly(vinylamine).

26. The process of claim 25, wherein the synthetic vinyl polymer is a vinyl pyrrolidone-styrene copolymer.

27. The process of claim 1 or claim 12, wherein the sizing composition further includes a colorant.

28. The process of claim 27, wherein the colorant is a pigment.

29. The process of claim 28, wherein the pigment is selected from the group consisting of silica, titanium dioxide and calcium carbonate.

30. The process of claim 27, wherein the colorant is a dye.

31. The process of claim 1 or claim 12, wherein the sizing agent represents approximately 5 wt. % to 95 wt. % of the sizing composition, based upon total solids weight of the composition after drying.

32. The process of claim 12, wherein the polyacid is polymeric.

33. A paper product sized by the process of claim 32.

34. The process of claim 32, wherein the polymeric polyacid is a carboxylic acid-containing polymer.

35. The process of claim 34, wherein the polymeric polyacid is selected from the group consisting of poly(acrylic acid), poly(acrylonitrile-acrylic acid), poly(styrene-acrylic acid), poly(butadiene-acrylonitrile acrylic acid), poly(butylacrylate-acrylic acid), poly(ethyl acrylate-acrylic acid), poly(ethylene-propylene-acrylic acid), poly(propylene-acrylic acid), alginic acid, phytic acid, and combinations thereof, and the polymeric polybase is selected from the group consisting of polyethyleneimine, polyvinylpyridine, polyallylamine (including N-alkylated and N,N-dialkylated polyallylamines), polyvinylaziridine, polyimidazole, polylysine, chitosan, poly(amino and alkylated amino)ethylenes, ethoxylated polyethyleneimine, propoxylated polyethyleneimine, and combinations thereof.

36. The process of claim 12, wherein the polyacid is monomeric.

37. The process of claim 36, wherein the monomeric polyacid has the structural formula $$[R\text{—}L_x\text{—}COOH)_y]_z$$

wherein:
R is selected from the group consisting of alkyl, alkenyl, aryl of 1 to 3 rings which may be fused or linked, and 5- and 6-membered heterocyclic rings having from 1 to 3 heteroatoms selected from N, S and O;
L is an alkylene or alkenylene chain containing 1 to 8 carbon atoms;

x is 0 or 1;

y is an integer in the range of 2 to 10 inclusive; and z is 1,2 or 3, with the proviso that if z is 2 or 3, the distinct R groups are covalently linked to each other, and the polymeric polybase comprises a nitrogenous polymer.

38. The process of claim 37 wherein the monomeric polyacid is selected from the group consisting of oxalic acid, maleic acid, succinic acid, methylsuccinic acid, malonic acid, adipic acid, glutaric acid, fumaric acid, dihydroxyfumaric acid, malic acid, mesaconic acid, itaconic acid, phthalic acid, isophthalic acid, terephthalic acid, 1,2-, 1,3- and 1,4-cyclohexane dicarboxylic acids, 1,2,3-cyclohexane tricarboxylic acid, 1,2,4-cyclohexane tricarboxylic acid, 1,3,5-cyclohexane tricarboxylic acid, 1,2- and 1,3-cyclopentane dicarboxylic acids, citric acid, tartaric acid, dihydroxyterephthalic acid, 1,2,3-, 1,2,4- and 1,2,5-benzene tricarboxylic acids, tricarballylic acid, 1,2,4,5-benzene tetracarboxylic acid, norbornene tetracarboxylic acid, 3,3',4,4'-benzophenone tetracarboxylic acid, 1,2,3,4,5,6-benzene hexacarboxylic acid, aspartic acid, glutamic acid, and combinations thereof, and the polymeric polybase is selected from the group consisting of polyethyleneimine, polyvinylpyridine, polyallylamine (including N-alkylated and N,N-dialkylated polyallylamines), polyvinylaziridine, polyimidazole, polylysine, chitosan, poly(amino and alkylated amino)ethylenes, ethoxylated polyethyleneimine, propoxylated polyethyleneimine, and combinations thereof.

39. A paper product sized by the process of claim 36.

40. The process of claim 12, wherein the nitrogenous polymer is a polymer containing two or more primary amine groups, secondary amine groups and/or tertiary amine groups.

41. The process of claim 40, wherein the nitrogenous polymer is selected from the group consisting of polylysine, polyallylamine, N-alkylated polyallylamine, N,N-dialkylated polyallylamine, chitosan, polyaminoethylene, poly(alkylated amino)ethylene, and combinations thereof.

42. The process of claim 12, wherein the nitrogenous polymer is a polyamine.

43. The process of claim 42, wherein the polyamine is selected from the group consisting of polyethylene imine, ethoxylated polyethyleneimine, propoxylated polyethyleneimine, and combinations thereof.

44. The process of claim 12, wherein the nitrogenous polymer is a polymer containing two or more three- to five-membered nitrogen-containing heterocycles.

45. The process of claim 44, wherein the polymer is selected from the group consisting of polyvinylpyridine, polyvinylaziridine, polyimidazole, and combinations thereof.

* * * * *